United States Patent
Weaver

[19]

[11] Patent Number: 6,105,697

[45] Date of Patent: *Aug. 22, 2000

[54] HYBRID TURBINE-ELECTRIC MOTOR SYSTEM

[76] Inventor: Winstead B. Weaver, 8215 Sunland Blvd., Sun Valley, Calif. 91352

[ * ] Notice: This patent is subject to a terminal disclaimer.

[21] Appl. No.: 08/825,373

[22] Filed: Mar. 28, 1997

Related U.S. Application Data

[60] Provisional application No. 60/014,525, Apr. 1, 1996.

[51] Int. Cl.$^7$ ........................................................ B60K 1/00
[52] U.S. Cl. ......................................... 180/65.3; 180/65.2
[58] Field of Search ................................... 180/65.1, 65.2, 180/65.3, 65.4, 65.8

[56] References Cited

U.S. PATENT DOCUMENTS

| | | | |
|---|---|---|---|
| 3,970,163 | 7/1976 | Kinoshita | 180/65 |
| 5,765,656 | 6/1998 | Weaver | 180/65.3 |
| 5,775,449 | 7/1998 | Moroto | 180/65.2 |
| 5,778,997 | 7/1998 | Setaka et al. | 180/65.2 |
| 5,785,136 | 7/1998 | Falkenmayer et al. | 180/65.2 |
| 5,786,640 | 7/1998 | Sakai et al. | 290/17 |

*Primary Examiner*—J. J. Swann
*Assistant Examiner*—Kevin McKinley
*Attorney, Agent, or Firm*—Albert O. Cota

[57] ABSTRACT

An improved hybrid turbine-electrical motor system (10) that is designed to replace conventional internal combustion piston engines. The system (10) is disclosed in two design configurations: a first basic design which includes a fuel source (12), a turbine (14), an alternator (16), a motor speed controller (18), a drive motor (20) and a load (22) and a second design which includes additional elements that enhance the operation of the system (10). These other elements include a gear reduction transmission (24) that reduces the shaft speed of the turbine, a speed regulator (19) that remotely controls the operation of the motor speed controller (18), a plurality of leak detectors (26) which alert an operator that there is an accumulation of gas, a heater (60) which utilizes the hot exhaust gases from the turbine (14) to heat the interior of a vehicle, and an auxiliary power unit (APU) (30) that functions in combination with an APU activating circuit (40). The APU (30) is activated to enhance the operation of the turbine (14) when the load requirements of the turbine (14) have been exceeded.

19 Claims, 3 Drawing Sheets

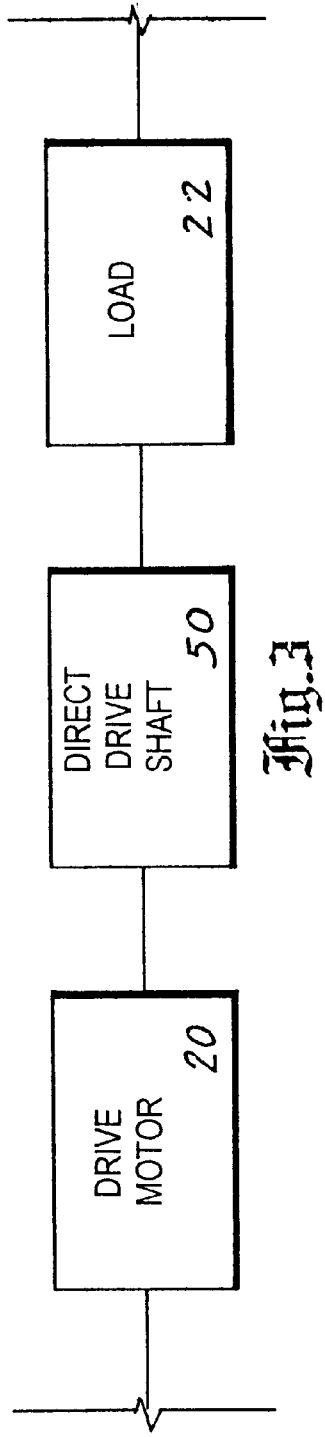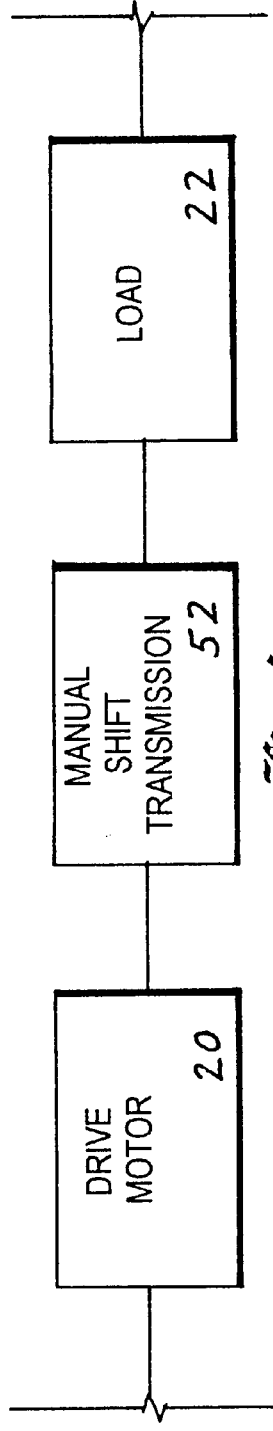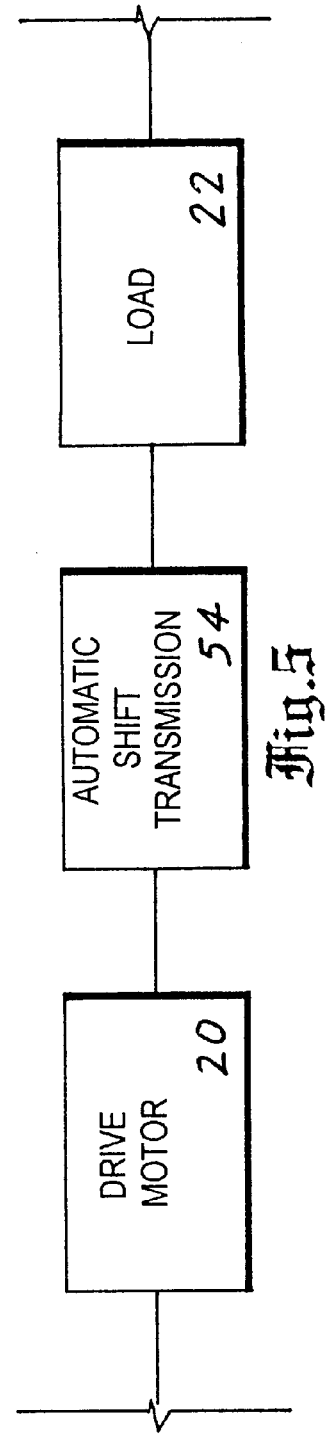

HYBRID TURBINE-ELECTRIC MOTOR SYSTEM

TECHNICAL FIELD

This application claims priority of Provisional Application No. 60/014,525 filed Apr. 01, 1996.

The invention pertains to the general field of hybrid electric drive systems and more particularly to an improved hybrid turbine-electric motor system that is particularly adaptable for powering a vehicle.

BACKGROUND ART

In the prior art, many types of electric and hybrid turbine-electric drives have been used in endeavoring to produce an efficient drive system and particularly one that produces low smog emissions.

Much of this prior art has been directed to all electric drive vehicles, where batteries become the limiting feature, particularly in mileage prior to recharging. Some hybrid vehicles have been developed which include the combination of an electrically driven motor and an internal combustion piston engine either directly driving the wheels or producing battery charging power through a generator or alternator.

The damage that has been caused to the earth's atmosphere as a result of using internal combustion engines over the past decades is enormous. Scientists and researchers have repeatably predicted that if the use of conventional internal combustion engines continues at the current rate, irrepairable destruction of the earth's ozone layer is probable. As a result, many vehicle manufacturers are actively searching for a new type of power supply, realizing that even if the government was not implementing mandatory changes, it is in the best interest of all people, i.e., consumers, to remedy the problem at hand.

As stated above, although there have been a substantial number of potential new engine designs, none yet have been proven to be sufficiently viable for mass use. One of the most significant detriments is that most people who use current vehicles have become accustomed to a consistent level of performance and operating procedures, i.e., the purchase of, and application of gasoline, motor oil and the like. Unfortunately, there is a stigma attached and many people, especially those who are less familiar with technological advancements and trends, do not believe that an engine can function without the items that have been used since the inception of the internal combustion engine. It does not help that some new vehicles equipped with alternative power sources, such as the highly-publicized electric car, do not provide many of their predecessors capabilities. For example, whenever a consumer is told that their new, zero-emissions, electric cars can only be driven 60–100 miles and then must be re-charged for 8 hours, a normal reaction is that why would anyone want that inconvenience when, even a gas-guzzling old big car, can still go a few hundred miles on one tank of gas. Unfortunately, a large percent of the population is of the attitude that pollution control is someone else's problem and what difference is one car going to make, anyway.

Obviously, if there was some way of developing a new, zero (or even negligible) emissions vehicle, that was capable of providing many of the same characteristics of conventional internal combustion engines, a tremendous benefit would accrue to both our planet and to most consumers.

A search of the prior art did not disclose any patents that read directly on the claims of the instant invention, however the following U.S. Pat. Nos. are considered related:

| PATENT NO. | INVENTOR | ISSUED |
| --- | --- | --- |
| 5,346,031 | Gardner | Sept. 13, 1994. |
| 5,331,806 | Warkentin | July 26, 1994. |
| 5,193,634 | Masut | Mar. 16, 1993. |
| 4,043,126 | Santos | Aug. 23, 1977. |
| 3,762,161 | Pennig | Oct. 2, 1973. |

The U.S. Pat. No. 5,346,031 discloses a hybrid motor vehicle propulsion system using an internal combustion engine to cruise and an electric motor for acceleration. Clutches are used to disengage each drive and an electric generator, driven from the engine, is employed to charge the batteries.

The U.S. Pat. No. 5,331,806 discloses a hydrogen fueled gas turbine engine. A compressor provides steam as a working fluid and hydrogen gas is used for combustion. Oxygen is supplied to oxidize the hydrogen fuel with an igniter to fire the mixture.

The U.S. Pat. No. 5,193,634 discloses a hybrid propulsion for vehicles having an internal combustion engine driving at least one wheel through a transmission and clutch. An electric motor is connected to the wheel through a second clutch positioned downstream in the drive train. An alternator driven by the engine charges the battery.

The U.S. Pat. No. 4,043,126 discloses an engine for driving an automotive vehicle having a plurality of turbine rotors mounted on the main drive shaft. Compressed air is supplied to the rotors in succession from a distributing valve which is supplied with compressed air from a main air tank. Compressed air at reduced pressure from the delivery side of each turbine rotor is supplied to a manifold which also supplies the main air tank through a second stage compressor.

The U.S. Pat. No. 3,762,161 discloses a gas turbine for the drive of motor Vehicles which includes a free output turbine. The turbine is connected during braking with the compressor by way of a hydrostatic force-transmitting system consisting of a pump and of a motor. The motor is adapted to be selectively engaged and disengaged by filling and emptying the circulatory system thereof.

For background purposes and as indicative of the art to which the invention is related reference may be made to the remaining cited patents.

| PATENT NO. | INVENTOR | ISSUED |
| --- | --- | --- |
| 5,433,282 | Moroto, et al | July 18, 1995. |
| 4,037,409 | Leibach | July 26, 1977. |
| 3,958,655 | Kronogard | May 25, 1976. |
| 3,543,873 | Toy | Dec. 1, 1970. |
| 3,525,874 | Toy | Aug. 25, 1970. |
| 3,446,306 | Williams | May 27, 1969. |

DISCLOSURE OF THE INVENTION

The improved hybrid turbine-electric motor system is designed to be applied to a load such as to the wheels of a vehicle. The system is designed to replace conventional internal combustion piston engines; and when the system fuel source is hydrogen or some other non-fossil fuel, the system produces negligible air pollutants.

In its most basic design configuration, the inventive system consists of:
a) A fuel source,
b) a turbine having an input and an output shaft. The input has means for receiving and igniting the fuel source which operates the turbine,
c) an alternator having an input and an output, wherein the input is connected to the output shaft of the turbine,
d) a motor speed controller having an input and an output, wherein the input is electrically connected to the output of the alternator,
e) at least one drive motor having an input and an output shaft, wherein the input is electrically connected to the output of the motor speed controller, and
f) a load connected to the output shaft on the drive motor.

The fuel source can consists of either fossil or non-fossil fuel. When the fuel source is a non-fossil fuel such as hydrogen, the hydrogen is stored in a high pressure vessel which includes a pressure regulator that reduces the hydrogen pressure to an acceptable safety level prior to being introduced into the turbine. To further increase the safety aspect of the invention, a plurality of hydrogen leak detectors are loaded in potential hydrogen collection areas within the vehicle.

The turbine is operated by the fuel source which is ignited by an electrical ignition means consisting of a spark plug or a glow plug. The turbine preferably incorporates a gear reduction transmission that reduces the turbine shaft speed to an optimum rpm prior to being applied to the alternator.

The improved hybrid electric motor vehicle drive system is designed to operate without any external electrical power source. However, the system includes provisions to allow an auxiliary power unit (APU) to be connected into the system. The APU is enabled and connected into the system, by an APU activating circuit, when the system load increases to a load level that is greater than the maximum design limit of the turbine.

In view of the above disclosure it is the primary object of the invention to produce an improved hybrid turbine-electric motor system that replaces internal combustion piston engines, that operates more efficiently and that when being fueled by hydrogen produces negligible pollutants.

In addition to the primary object of the invention it is also an object of the invention to produce an improved hybrid electric motor system that:
has less weight and volume that conventional internal combustion piston engines. The weight of the required stored batteries in combination with the weight of the internal combustion engine, has been a deterrent in the successful development of such a system for use on a vehicle. The overall weight of a vehicle requires a specific amount of horsepower to provide acceptable acceleration levels and incline speed capabilities. An internal combustion engine is inherently heavy by nature and the addition of a traction motor and stored batteries create insurmountable problems of weight versus horsepower in a conventional hybrid electric vehicle. The present invention easily overcomes this difficulty by using a gas turbine that is directly coupled to an electric alternator. As the speeds of a gas turbine are relatively high, 90,000 to 100,000 RPM, the equivalent power obtained from a very small light weight package is an insignificant percentage of the weight of a conventional internal combustion engine of the same horsepower.

can easily incorporate a turbine exhaust gas heater for the vehicles interior. AS the gas turbine engine emits a heated exhaust, an exhaust gas-to-fresh air heat exchanger is employed that transfers this waste heat to the vehicle's air distribution system at controlled volumes.

is reliable, easily maintained, and is cost effective from both a manufacturing and consumer points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 3 is a block diagram showing the drive motor connected to the load by means of a direct drive.

FIG. 4 is a block diagram showing the drive motor connected to the load by a means of a manual transmission.

FIG. 5 is a block diagram showing the drive motor connected to the load by means of an automatic transmission.

BEST MODE FOR CARRYING OUT THE INVENTION

The best mode for carrying out the invention is presented in terms of a preferred embodiment for an improved hybrid turbine-electric motor system 10 which is designed to replace conventional internal combustion piston engines. The improved system provides power with greater efficiency then conventional engines and, when a non-fossil fuel such as hydrogen gas is the fuel source, the system is capable of operating with negligible air pollutant emissions.

Figure 1:
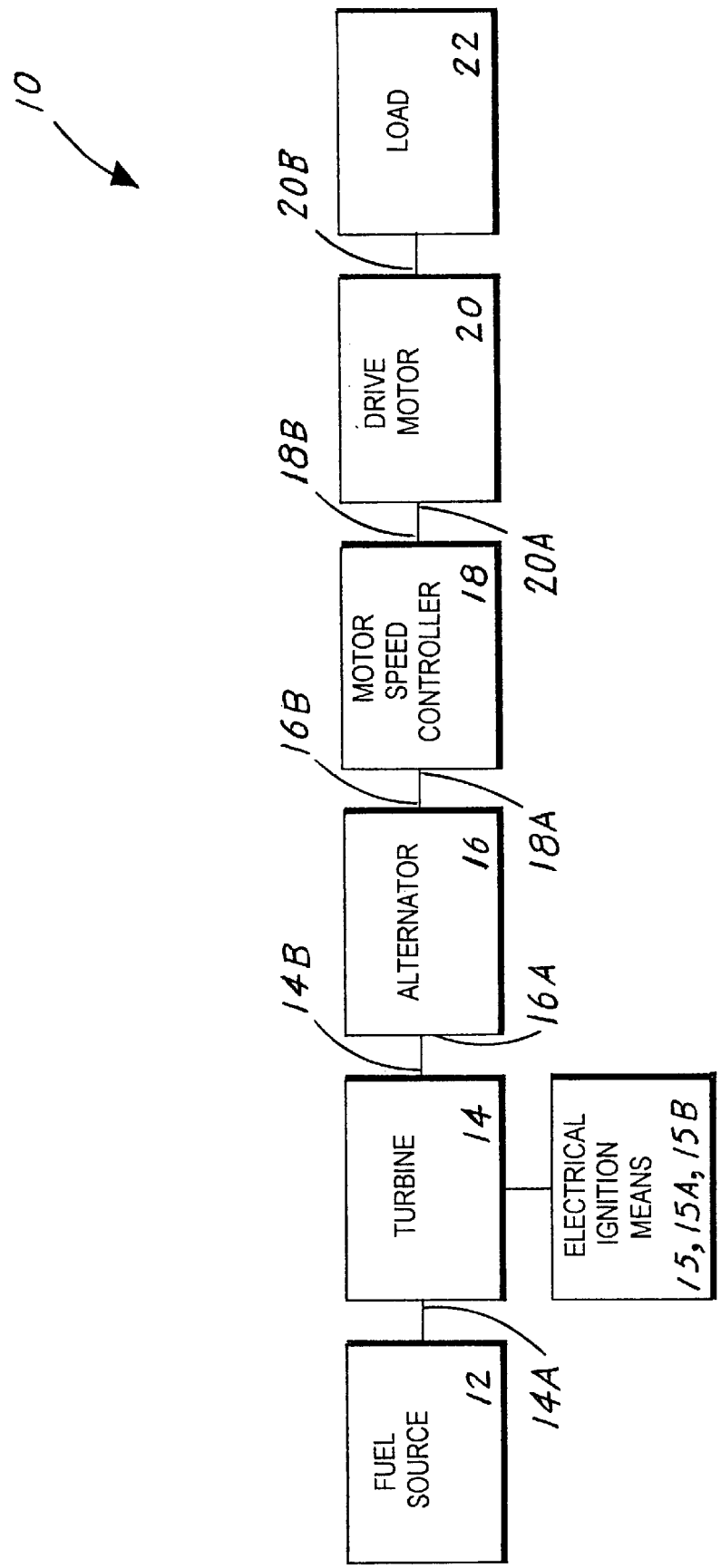
FIG. 1 is a block diagram of the improved hybrid turbine-electric motor system shown in its basic design configuration.

The preferred embodiment of the system 10 is disclosed in terms of a basic system 10 as shown in FIG. 1, and an enhanced system 10 as shown in FIGS. 2–5. The basic system is comprised of the following major elements: a fuel source 12, a turbine 14, an electrical ignition means 15, an alternator 16, a motor speed controller 18, a drive motor 20 and a load 22. The enhanced design further includes a gear reduction transmission 24, a hydrogen leak detector 26, an auxiliary power unit (APU) 30, an APU activating circuit 40 and a heater 60. For illustrative and explanatory purposes, the load 22 is comprised of a vehicle 100 and drive wheels 110, although neither is claimed as an element of the inventive system 10.

As stated above, the system 10 is designed to replace current internal combustion piston engines. In the same way that most current engines utilize gasoline or diesel as a fuel source the system 10 also utilizes a fuel source 12. The difference is that in addition to gasoline or diesel, the system 10 may also use other fossil fuels such as kerosene, natural gas, propane or jet fuel. The system 10 can also be operated with a non-fossil fuel, such as hydrogen. When hydrogen is used, it is stored in a 1,000 to 20,000 PSI pressure vessel 28. The pressure vessel 28 includes a pressure regulator 29 that reduces the hydrogen pressure to 10 to 100 PSI prior to introduction into the turbine 14. Also, for safety reasons, whenever hydrogen gas is used as the fuel source 12, and the load 22 is a vehicle 100, a plurality of hydrogen leak detectors 26, as shown in FIG. 2, are located in potential collection areas within the vehicle 100.

The fuel source 12 is applied to the turbine 14 through the turbine's input 14A. The fuel source 12 is then ignited by the electrical ignition means 15, which is located within the turbine structure. The ignition means may be comprised of either a spark plug 15A or a glow plug 15B.

Figure 2:
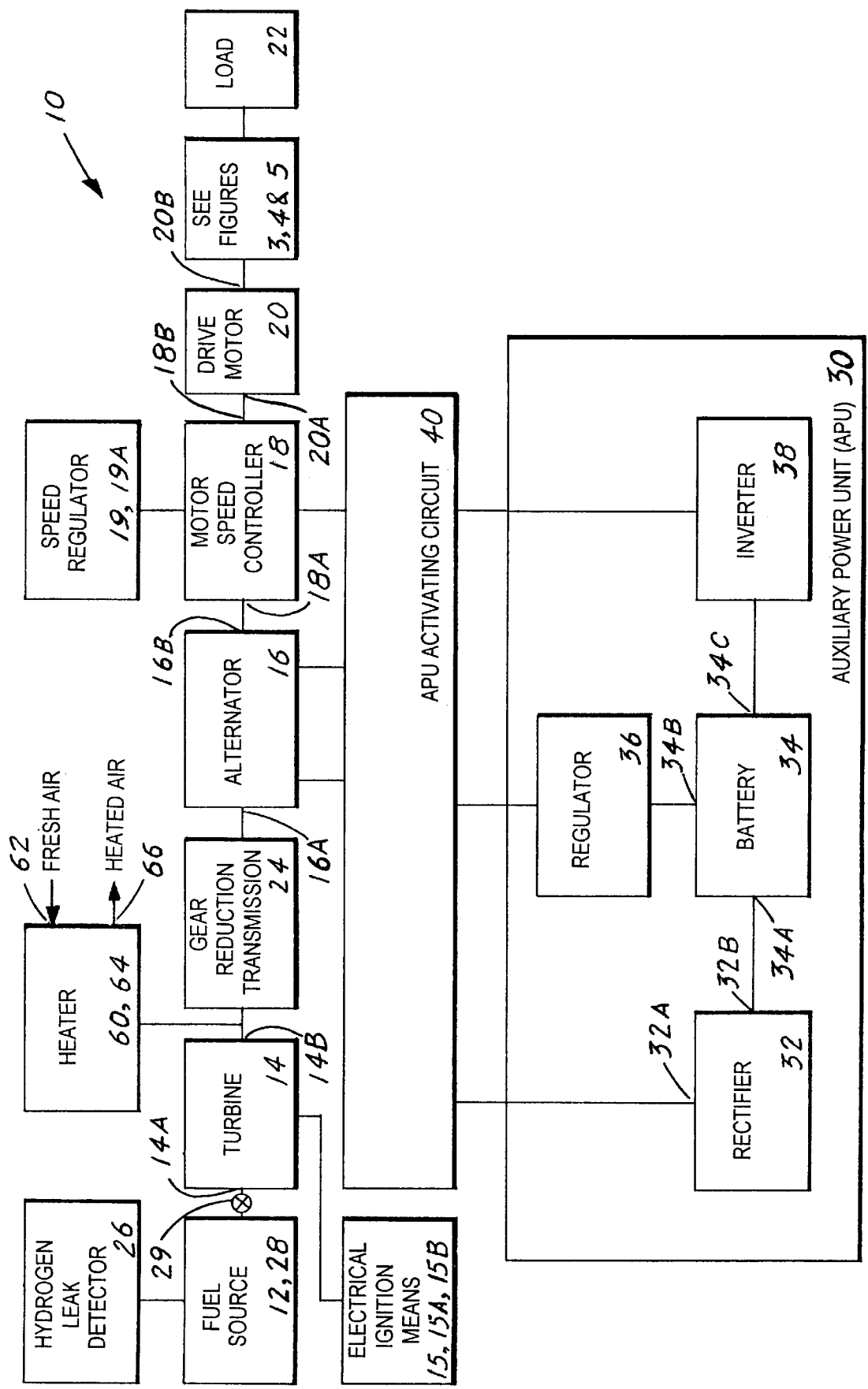
FIG. 2 is a block diagram of the system shown with added features which include an auxiliary power unit that is enabled when the turbine exceeds its maximum load capabilities.

The gear reduction transmission 24, as shown in FIG. 2, is also an element of the turbine 14. The transmission 24 is designed to reduce the shaft speed of the turbine by a ratio of 10:1 to 40:1 before the turbine output 14B is applied to the alternator 16. As shown in FIG. 1, the turbine's output shaft 14B is connected to an input 16A on the alternator 16.

The alternator 16 is comprised of a high-voltage, high-amperage alternator that produces a voltage between 0 to 1000 volts a-c at a frequency ranging from 0 Hz (alternator at dead stop) to 1600 Hz. The output 16B of the alternator 16 is connected to an input 18A on the motor speed controller 18. The motor speed controller 18 controls the output frequency and/or voltage, and is operated and controlled by the speed regulator 19 as shown in FIG. 2. The speed regulator 19 includes a variable voltage circuit 19A having means for controlling the output frequency and/or voltage of the motor speed controller 18. The output 18B of the controller 18, which controls the speed of the drive motor 20, is electrically connected to the input 20A on the motor 20. The drive motor 20 is comprised of an alternating current electric motor.

From the output 20B of the drive motor 20 power is supplied to the load 22, which for purposes of discussion is comprised of the set of drive wheels 110, connected to the vehicle 100. Between the drive motor 20 and the load 22 is a connecting means. The connection means may consist of a direct drive shaft 50 as shown in FIG. 3, a manual shift transmission 52 as shown in FIG. 4 or an automatic-shift transmission 54 as shown in FIG. 5. Although the load 22 is primarily referred to as a vehicle the load 22 may also be a locomotive engine, boats and ships of various sizes, large or small machinery or any apparatus that can be operated by the drive motor 20.

The basic system 10, as shown in FIG. 1, can also be designed to include an auxiliary power unit, (APU) 30. The APU, as shown in FIG. 2, is connected through an APU activating circuit 40 to the alternator 16 and to the motor speed controller 18. The APU activating circuit 40 activates the APU when the design limits on the turbine 14 are exceeded or there is a failure of the turbine 14.

As also shown in FIG. 2, the APU 30 is comprised of four major elements: a rectifier 32, a rechargeable battery 34, a regulator 36 and an inverter 38. The rectifier 32 has an input 32A and an output 32B. The input 32A is applied from the alternator 16 via the APU switching circuit 40. The output 32B of the rectifier 32 is applied to the input 34A of the battery 34. The battery includes two outputs, a first output 34B and a second output 34C. The first output 34B is applied through the regulator 36 to the alternator 16 via the APU switching circuit 40. Likewise, the second output 34C is applied through the inverter 38 to the motor speed controller 18 via the APU switching circuit 40.

The operation of the auxiliary power unit 30 is as follows: when the voltage of the rechargeable battery 34 drops below the rated voltage of the battery, the regulator 36 applies a signal to the alternator 16. The alternator 16 then applies an a-c current to the rectifier 32 which rectifies the current to produce a d-c charging current to recharge the battery 34 to the rated battery voltage. The battery voltage then is applied to the inverter 38 which produces an a-c current that is applied to the motor speed controller 18 via the APU activating unit 40. The a-c current applied to the controller 18 is at a frequency that substantially corresponds to the operating frequency of the turbine 14. Thus, with the application of the a-c current to the motor speed controller 18 the system 10 remains within its operational design limits.

As an option, the heater 60 may be utilized to supply heated air to the interior of the vehicle 100. The heater 60, as shown in FIG. 2, comprises a fresh air intake 62, an exhaust gas-to-fresh air heat exchanger 64 and a vehicle air distribution system 66. When fresh air enters the air intake 62 it is directed through the heat exchanger 64 where heat is extracted from the exhaust of the turbine 14. From there, the heat is introduced into the vehicle's 100 interior through the air distribution system 66.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. An improved hybrid turbine electric motor system comprising:

a) a fuel source, b) a turbine having an input and an output shaft with the input having means for receiving said fuel source which operates said turbine, c) an alternator having an input and an output, wherein the input is connected to the output shaft of said turbine, d) a motor speed controller having an input and an output, wherein the input is electrically connected to the output of said alternator, e) at least one drive motor having an input and an output shaft, wherein the input is electrically connected to the output of said motor speed controller, and f) a load connected to the output shaft on said drive motor.

2. The system as specified in claim 1 wherein said fuel source comprises a non-fossil fuel.

3. The system as specified in claim 2 wherein said non-fossil fuel comprises hydrogen.

4. The system as specified in claim 3 wherein said hydrogen is stored in a 1,000 to 20,000 PSI pressure vessel which includes a pressure regulator that reduces the hydrogen pressure to 10 to 100 PSI prior to introduction into said turbine.

5. The system as specified in claim 4 further comprising a plurality of hydrogen leak detectors located in potential collection areas within said vehicle.

6. The system as specified in claim 1 wherein said fuel source comprises a fossil fuel.

7. The system as specified in claim 6 wherein said fossil fuel is comprised of either gasoline, diesel, kerosene, natural gas, propane or jet fuel.

8. The system as specified in claim 1 wherein said fuel source which operates said turbine is ignited by an electrical ignition means located within said turbine.

9. The system as specified in claim 8 wherein said ignition means comprises a spark plug or a glow plug.

10. The system as specified in claim 1 wherein said alternator is comprised of a high-voltage, high-amperage alternator that produces a voltage between 0 to 1000 volts a-c at a frequency ranging from 0 Hz to 1600 Hz.

11. The system as specified in claim 1 wherein said motor speed controller, which produces an output frequency and/or a voltage, is operated and controlled by a speed regulator which includes a variable voltage circuit having means for controlling the output frequency and/or voltage of said controller which, in turn, controls the speed of said drive motor.

12. The system as specified in claim 1 wherein said drive motor is comprised of an alternating current electric motor.

13. The system as specified in claim 12 wherein said drive motor is electrically connected to said motor speed controller.

14. The system as specified in claim 13 further comprising a transmission that is connected between said drive motor and said load.

15. The system as specified in claim 14 wherein said transmission is comprised of a manual-shift transmission.

16. The system as specified in claim 14 wherein said transmission is comprised of an automatic-shift transmission.

17. The system as specified in claim 1 wherein said load is comprised of a set of drive wheels connected to a vehicle.

18. The system as specified in claim 1 further comprising:
   a) an auxiliary power unit (APU) connected through an APU activating circuit to said alternator and to said motor speed controller, wherein said APU activating circuit activates said APU when the design limits of said turbine are exceeded, and
   b) a rectifier having an input and an output, wherein the input is applied from said alternator via said APU activating circuit, and
   c) a rechargeable battery having an input, a first output and a second output, wherein the input is applied from the output of said rectifier, the first output is applied through a regulator to said alternator, and the second output is applied through an inverter to said motor speed controller, wherein when the voltage of said rechargeable battery drops to a lower limit, said regulator applies a signal to said alternator which then applies an a-c current to said rectifier which applies a d-c charging current to recharge said battery, said battery then activates said inverter to allow said inverter to apply an a-c current to said motor speed controller.

19. The system as specified in claim 1 further comprising a heater having a fresh air intake, an exhaust gas-to-fresh air heat exchanger and a vehicle air distribution system, wherein fresh air enters said fresh air intake and is directed through said heat exchanger where heat is extracted from the exhaust of said turbine and introduced into a vehicle's interior through said vehicle air distribution system ducts.

* * * * *